US006843504B2

(12) United States Patent
Motozawa (10) Patent No.: US 6,843,504 B2
(45) Date of Patent: Jan. 18, 2005

(54) AUTOMOTIVE VEHICLE OCCUPANT PROTECTION SYSTEM

(75) Inventor: Yasuki Motozawa, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/198,403

(22) Filed: Jul. 17, 2002

(65) Prior Publication Data

US 2003/0029661 A1 Feb. 13, 2003

(30) Foreign Application Priority Data

Jul. 18, 2001 (JP) ........................... 2001-218483

(51) Int. Cl.$^7$ ............................................. B60R 22/36
(52) U.S. Cl. ................................ 280/806; 280/801.1
(58) Field of Search ............................. 280/806, 801.1

(56) References Cited

U.S. PATENT DOCUMENTS

| | | | |
|---|---|---|---|
| 2,193,949 A | 3/1940 | Tibbetts | 296/28 |
| 2,959,446 A | 11/1960 | Thompson | 296/65 |
| 2,965,403 A | 12/1960 | Barenyi et al. | 293/63 |
| 3,001,815 A | 9/1961 | Weber | 296/65 |
| 3,732,944 A | 5/1973 | Kendall | 180/103 |
| 3,831,997 A | 8/1974 | Myers | 296/28 R |
| 3,848,886 A | 11/1974 | Feustel et al. | 280/106 R |
| 3,871,470 A | 3/1975 | Schwanz et al. | 180/82 C |
| 3,897,101 A | 7/1975 | Hess | 296/65 A |
| 3,912,295 A | 10/1975 | Eggert, Jr. | 280/106 R |
| 3,961,805 A | 6/1976 | Satzinger | 280/747 |
| 3,992,046 A | 11/1976 | Braess | 296/65 A |
| 3,998,291 A | 12/1976 | Davis | 180/91 |
| 4,008,909 A | 2/1977 | Otani et al. | 280/746 |
| 4,152,012 A | 5/1979 | Reidelbach et al. | 280/784 |
| 4,156,472 A | 5/1979 | Kunz | 177/25 |
| 4,221,403 A | 9/1980 | Grosser | 280/806 |

(List continued on next page.)

FOREIGN PATENT DOCUMENTS

| | | |
|---|---|---|
| DE | 3420397 A1 | 12/1985 |
| DE | 3424-928 A1 | 1/1986 |
| DE | 9207774 | 12/1992 |

(List continued on next page.)

OTHER PUBLICATIONS

Patent Abstract, Patent No. JP7101354, Published Apr. 18, 1995.
U.S. Appl. No. 10/005,739 filed Nov. 6, 2001, 25 pages.
U.S. Appl. No. 10/170,279 filed Jun. 11, 2002, 25 pages.
English Language Abstract, FR 2 744 684 A1, Apr. 14, 1997.

(List continued on next page.)

Primary Examiner—Christopher P. Ellis
Assistant Examiner—Rashmi Sharma
(74) Attorney, Agent, or Firm—MacPherson Kwok Chen & Heid LLP (57) ABSTRACT

An end of a seat belt is connected to an actuator that can selectively remove a slack from the seat belt. The actuator includes a main actuator unit, and a cushioning member for decelerating a movement of the moveable end of the seat belt following a certain initial travel of the moveable end. The main actuator unit includes a cylinder integrally attached to a part of the vehicle body, a piston member slidably received in the cylinder and connected to the moveable end, a pyrotechnic gas generator provided on one end of the cylinder, and an accumulator chamber defining a prescribed volume and communicating with an output end of the pyrotechnic gas generator. The main actuator unit produces an early rise in the vehicle occupant deceleration, and the cushioning member smoothly connects the time history of the vehicle occupant deceleration to a ride-down condition whereby the deceleration acting on the vehicle occupant is favorably spread over time, and the maximum level of the deceleration can be minimized. The accumulator chamber contributes to a favorable shaping of the time history of the vehicle occupant deceleration.

9 Claims, 6 Drawing Sheets

U.S. PATENT DOCUMENTS

| | | | |
|---|---|---|---|
| 4,237,690 A | 12/1980 | Tsuge et al. .................. 60/635 |
| 4,288,098 A | 9/1981 | Tsuge et al. ................. 280/806 |
| 4,317,584 A | 3/1982 | Takata ........................ 280/804 |
| 4,413,856 A | 11/1983 | McMahan et al. ........... 296/188 |
| 4,458,921 A | 7/1984 | Chiba et al. ................. 280/806 |
| 4,702,515 A | 10/1987 | Kato et al. ................... 296/189 |
| 4,728,141 A * | 3/1988 | Motozawa et al. ....... 296/37.16 |
| 4,832,409 A | 5/1989 | Borlinghaus et al. ........ 297/468 |
| 4,881,781 A | 11/1989 | Borlinghaus et al. ........ 297/473 |
| 4,901,500 A | 2/1990 | Wycech ........................ 52/793 |
| 4,925,212 A * | 5/1990 | Motozawa ................... 280/807 |
| 4,932,722 A * | 6/1990 | Motozawa ................... 297/480 |
| 4,968,059 A * | 11/1990 | Motozawa et al. .......... 280/806 |
| 5,033,593 A | 7/1991 | Kazuhito ..................... 188/377 |
| 5,040,646 A | 8/1991 | Drefahl ....................... 188/371 |
| 5,048,888 A | 9/1991 | Willy et al. .................. 296/189 |
| 5,123,673 A | 6/1992 | Tame ....................... 280/801.1 |
| 5,167,421 A | 12/1992 | Yunzhao ..................... 297/216 |
| 5,201,912 A | 4/1993 | Terada et al. ............... 293/120 |
| 5,207,618 A | 5/1993 | Nishizawa .................. 474/101 |
| 5,224,574 A | 7/1993 | Thum ......................... 188/371 |
| 5,244,248 A | 9/1993 | Bovellan .................... 296/194 |
| 5,286,085 A | 2/1994 | Minami .................... 297/250.1 |
| 5,409,262 A | 4/1995 | McLennan .................. 280/784 |
| 5,429,388 A | 7/1995 | Wheatley et al. ........... 280/784 |
| 5,437,494 A | 8/1995 | Beauvais ................ 297/216.19 |
| 5,462,308 A * | 10/1995 | Seki et al. ................... 280/749 |
| 5,481,940 A | 1/1996 | Betz ......................... 74/502.6 |
| 5,552,986 A | 9/1996 | Omura et al. .......... 364/424.05 |
| 5,566,777 A | 10/1996 | Trommer et al. ........... 180/232 |
| 5,626,203 A | 5/1997 | Habib ......................... 180/274 |
| 5,634,664 A * | 6/1997 | Seki et al. ................... 280/806 |
| 5,636,424 A | 6/1997 | Singer et al. ............. 29/407.01 |
| 5,681,057 A | 10/1997 | Whirley et al. ............. 280/784 |
| 5,685,603 A | 11/1997 | Lane, Jr. ................. 297/216.11 |
| 5,746,467 A | 5/1998 | Jesadanont ................. 296/68.1 |
| 5,785,347 A | 7/1998 | Adolph et al. .............. 280/735 |
| 5,794,978 A | 8/1998 | Nishide ...................... 280/806 |
| 5,810,417 A | 9/1998 | Jesadanont ................. 296/68.1 |
| 5,853,195 A | 12/1998 | Le et al. ..................... 280/784 |
| 5,876,077 A | 3/1999 | Miskech et al. ............ 293/132 |
| 5,876,078 A | 3/1999 | Miskech et al. ............ 293/133 |
| 5,911,433 A | 6/1999 | Swann .................... 280/730.2 |
| 5,947,543 A | 9/1999 | Hubbard ................... 296/68.1 |
| 5,984,357 A | 11/1999 | Yasuda et al. .............. 280/806 |
| 5,984,402 A | 11/1999 | Takeuchi .................... 296/188 |
| 6,003,934 A | 12/1999 | Usui ..................... 296/203.02 |
| 6,003,937 A | 12/1999 | Dutton et al. ............ 297/216.1 |
| 6,042,190 A | 3/2000 | Mathe et al. ................ 297/483 |
| 6,068,329 A | 5/2000 | Miller ........................ 296/189 |
| 6,092,853 A | 7/2000 | Hubbard ................... 296/68.1 |
| 6,116,561 A | 9/2000 | Christopher ................ 248/429 |
| 6,131,951 A | 10/2000 | Chicken et al. ............. 280/806 |
| 6,170,865 B1 | 1/2001 | Barron ....................... 280/735 |
| 6,179,370 B1 | 1/2001 | Takeuchi .................... 296/188 |
| 6,186,574 B1 | 2/2001 | Motozawa et al. ......... 296/68.1 |
| 6,193,296 B1 | 2/2001 | Motozawa et al. ......... 296/68.1 |
| 6,203,098 B1 | 3/2001 | Motozawa et al. ......... 296/189 |
| 6,224,131 B1 | 5/2001 | Shammout .................. 296/68.1 |
| 6,227,563 B1 | 5/2001 | Talisman .................... 280/735 |
| 6,227,597 B1 | 5/2001 | Swann et al. ............... 296/68.1 |
| 6,237,991 B1 | 5/2001 | Weber ........................ 296/188 |
| 6,241,280 B1 | 6/2001 | Biewendt et al. ........... 280/735 |
| 6,254,164 B1 | 7/2001 | Kawamura et al. ......... 296/68.1 |
| 6,299,238 B1 | 10/2001 | Takagi et al. ............... 296/188 |
| 6,299,239 B1 | 10/2001 | Sagawa et al. .............. 296/188 |
| 6,340,176 B1 | 1/2002 | Webber et al. .............. 280/806 |
| 6,394,535 B1 | 5/2002 | Kawamura et al. ......... 296/68.1 |
| 6,398,292 B2 * | 6/2002 | Tsuruta et al. .............. 296/189 |
| 6,402,218 B1 * | 6/2002 | Kamei et al. ............... 296/68.1 |
| 6,419,271 B1 | 7/2002 | Yamada et al. ............. 280/806 |
| 6,422,632 B1 * | 7/2002 | Kamei et al. ............... 296/68.1 |
| 6,454,351 B2 * | 9/2002 | Motozawa et al. ..... 297/216.16 |
| 6,463,372 B1 * | 10/2002 | Yokota et al. ................ 701/45 |
| 6,578,894 B2 * | 6/2003 | Motozawa ................. 296/35.2 |
| 6,592,166 B2 * | 7/2003 | Motozawa ................. 296/68.1 |
| 6,604,771 B2 * | 8/2003 | Motozawa et al. ......... 296/68.1 |
| 6,644,723 B2 | 11/2003 | Motozawa ................. 296/189 |
| 2001/0028186 A1 | 10/2001 | Koyanagi et al. ........ 297/250.1 |

FOREIGN PATENT DOCUMENTS

| | | |
|---|---|---|
| DE | 4212091 A1 | 10/1993 |
| DE | 4323543 C1 | 10/1994 |
| DE | 29500093 | 4/1995 |
| DE | 4415467 C1 | 11/1995 |
| DE | 19516013 A1 | 5/1996 |
| DE | 19652050 | 4/1998 |
| DE | 19938940 A1 | 3/2000 |
| FR | 2 744 684 A1 | 8/1997 |
| GB | 1043695 | 9/1966 |
| GB | 2304651 A | 3/1997 |
| GB | 2340801 A | 3/2000 |
| GB | 2340802 A | 3/2000 |
| GB | 2351948 A | 1/2001 |
| JP | 58-89475 | 5/1983 |
| JP | 58-116268 | 7/1983 |
| JP | 4-310477 | 11/1992 |
| JP | 5-12361 | 2/1993 |
| JP | 5-238287 | 9/1993 |
| JP | 5-246252 | 9/1993 |
| JP | 5-246253 | 9/1993 |
| JP | 7-101354 | 4/1995 |
| JP | 7-205733 | 8/1995 |
| JP | 7-277140 | 10/1995 |
| JP | 10166918 A | 6/1998 |
| JP | 11-321559 | 11/1999 |
| JP | 2000-62556 | 2/2000 |
| JP | 2000-62557 | 2/2000 |
| JP | 2000-326824 | 11/2000 |
| JP | 2001-322531 | 11/2001 |
| JP | 2002-211352 | 7/2002 |
| WO | WO 91/14110 | 9/1991 |
| WO | WO 94/22692 | 10/1994 |
| WO | WO 96/04154 | 2/1996 |
| WO | WO 98/40238 | 9/1998 |
| WO | WO 99/62747 | 12/1999 |

OTHER PUBLICATIONS

English Language Abstract, DE3424928, Jan. 16, 1986.
Translation of Parts, DE4323543C1, Oct. 6, 1994.
English Language Abstract and Translation of Abstract and Claims 1 and 5–9, DE4415467C1, Nov. 23, 1995.
English Language Abstract, No. DE 19652050, Apr. 30, 1998 (1 page).
Patent Abstracts of Japan, 58–89475, May 27, 1983.
English Language Abstract, 58–116268, Jul. 11, 1983.
Patent Abstracts of Japan, 4–310477, Nov. 2, 1992.
English Language Abstract, 5–12361, Feb. 19, 1993.
English Language Abstract, 5–246252, Sep. 24, 1993.
English Language Abstract, 5–246253, Sep. 24, 1993
Patent Abstracts of Japan, 7–205733, Aug. 8, 1995.
English Language Abstract, 7–277140, Oct. 24, 1995.
English Language Abstract, 11–321559, Nov. 24, 1999.
Patent Abstracts of Japan, 2000–062556, Feb. 29, 2000.
Patent Abstracts of Japan, 2000–062557, Feb. 29, 2000.
English Language Abstract, 2000–326824, Nov. 28, 2000.
English Language Abstract, 2002–322531, Nov. 20, 2001.
English Language Abstract, 2002–211352, Jul. 31, 2002.
U.S. Appl. No. 10/198,405, filed Jul. 17, 2002, 25 pages.
English Language Abstract, JP 2003–306126, Oct. 28, 2003.

* cited by examiner

AUTOMOTIVE VEHICLE OCCUPANT PROTECTION SYSTEM

CROSS REFERENCE TO RELATED PATENTS (PATENT APPLICATIONS)

Reference should be made to the following commonly assigned prior patents (copending patent applications), and the contents of these patents (patent applications) are hereby incorporated in this application by reference.

| Our Ref: | Patent (Application) Number | Issue (Application) Date |
| --- | --- | --- |
| F650 | 6,193,296 | Feb. 27, 2001 |
| F651 | 6,186,574 | Feb. 13, 2001 |
| F655 | 6,203,098 | Mar. 20, 2001 |
| F685 | 6,254,164 | Jul. 3, 2001 |
| F686 | 09/608,669 | Jun. 30, 2000 |
| F687 | 09/648,190 | Aug. 23, 2000 |
| F716 | 09/729,973 | Dec. 6, 2000 |
| F781 | 10/005,739 | Nov. 6, 2001 |
| F817 | unknown | |
| F818 | unknown | |
| F819 | unknown | |

TECHNICAL FIELD

The present invention relates to a vehicle occupant protection system for improving the crash safety of the vehicle.

BACKGROUND OF THE INVENTION

In recent years, motor vehicles have been often fitted with a pretensioner device which positively increases the tension of the seat belt for restraining the vehicle occupant at the time of a crash and improves the protection of the vehicle occupant. The deceleration acting on the vehicle occupant who is restrained to the seat by a restraint device such as a seat belt starts rising only when the forward inertia force acting on the vehicle occupant at the time of the crash has started to be supported by the seat belt. As it is not possible to eliminate a certain amount of resiliency and slack in the seat belt, the deceleration of the vehicle occupant reaches a peak level only when the vehicle occupant has moved forward a certain distance under the inertia force and the elongation of the seat belt has reached its maximum extent. The peak value of the deceleration of the vehicle occupant gets greater as the forward displacement of the vehicle occupant under the inertia force increases, and is known to be substantially larger than the average deceleration of the passenger compartment of the vehicle body.

When the relationship between the vehicle body deceleration and the vehicle occupant deceleration is compared to the relationship between the input and output of a system consisting of a spring (vehicle occupant restraint device) and a mass (mass of the vehicle occupant), it can be readily understood that the maximum elongation and time history of the spring are dictated by the waveform (time history) of the vehicle body deceleration. Therefore, it can be concluded that the waveform of the vehicle body deceleration should be controlled in such a manner that not only the average deceleration acting on the vehicle body is reduced but also the overshoot of the vehicle occupant deceleration due to the elongation of the spring (vehicle occupant restraint device) is minimized.

In the conventional vehicle body structure, the impact energy is absorbed by a crushable zone, consisting of an impact reaction generating member such as side beams and gaps defined between various components, provided in a front part of the vehicle body, and the waveform of the vehicle body deceleration is adjusted by changing the resulting reaction properties by means of the selection of the dimensions and deformation properties of such parts. The deformation mode of the vehicle body other than the passenger compartment at the time of a crash may also be appropriately selected so that the deceleration of the passenger compartment of the vehicle body may be reduced, and the deformation may be prevented from reaching the passenger compartment. Such vehicle body structures are proposed in Japanese patent laid open publication (kokai) No. 07-101354.

Figure 6:
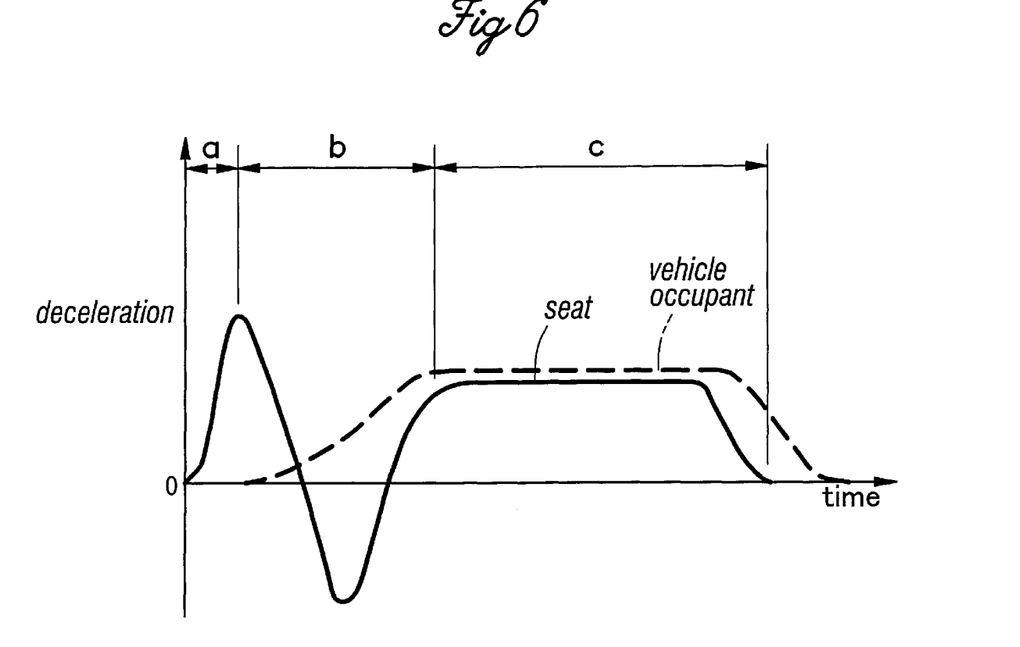
FIG. 6 is a diagram showing the waveforms of the vehicle occupant deceleration and vehicle body deceleration.

It is important to note that the injury to the vehicle occupant at the time of a vehicle crash can be minimized by reducing the maximum value of the acceleration (deceleration) acting on the vehicle occupant which is dictated by the waveform (time history) of the vehicle body deceleration. It is also important to note that the total amount of deceleration (time integration of deceleration) which the vehicle occupant experiences during a vehicle crash is fixed for the given intensity of crash (or vehicle speed immediately before the crash). Therefore, as shown in FIG. 6 for instance, the ideal waveform (time history) of the vehicle body (seat) deceleration (G2) for the minimization of the vehicle occupant deceleration (G1) should consist of an initial interval (a) for producing a large deceleration upon detection of a crash, an intermediate interval (b) for producing an opposite deceleration, and a final interval (c) for producing an average deceleration.

The initial interval allows the vehicle occupant to experience the deceleration from an early stage so that the deceleration may be spread over an extended period of time, and the peak value of the deceleration to be reduced. According to a normal vehicle body structure, owing to the presence of a crushable zone in a front part of the vehicle and a slack and elongation of the restraint system such as a seat belt, it takes a certain amount of time for the impact of a crash to reach the vehicle occupant. The delay in the transmission of deceleration to the vehicle occupant must be made up for by a subsequent sharp rise in deceleration according to the conventional arrangement. The final interval corresponds to a state called a ride-down state in which the vehicle occupant moves with the vehicle body as a single body. The intermediate interval is a transitional interval for smoothly connecting the initial interval and final interval without involving any substantial peak or dip in the deceleration. Computer simulations have verified that such a waveform for the vehicle body deceleration results in a smaller vehicle occupant deceleration than the case of a constant deceleration (rectangular waveform) for a given amount of deformation of the vehicle body (dynamic stroke).

According to the conventional vehicle body structure, the vehicle body components of the crushable zone start deforming from a part having a relatively small mechanical strength immediately after the crash, and a part thereof having a relatively high mechanical strength starts deforming thereafter. As a result, the waveform of the crash reaction or the vehicle body deceleration is small in an early phase, and then gets greater in a later phase so that the vehicle occupant deceleration cannot be adequately reduced. To eliminate such a problem, it has been proposed to obtain a prescribed amount of reaction force by making use of the collapsing of the side beams and to maintain a stable reaction by providing a plurality of partition walls in the side beams (Japanese patent laid-open publication (kokai) No.

07-101354). However, such previous proposals can only maintain the vehicle body deceleration at an approximately constant level at most, and are unable to provide a more effective deceleration waveform.

To minimize the adverse effect of the resiliency of the seat belt, it is known to provide a pretensioner device in association with the seat belt to positively tension the seat belt at the time of a vehicle crash. According to another previously proposed structure, at least one of the anchor points of the seat belt is attached to a member which undergoes a movement relative to the remaining part of the vehicle which tends to increase the tension of the seat belt in an early phase of a vehicle crash. Such devices are beneficial in reducing the maximum level of deceleration acting on the vehicle occupant at the time of a vehicle crash, but a device capable of more precise control of the vehicle occupant deceleration is desired.

Figure 7:
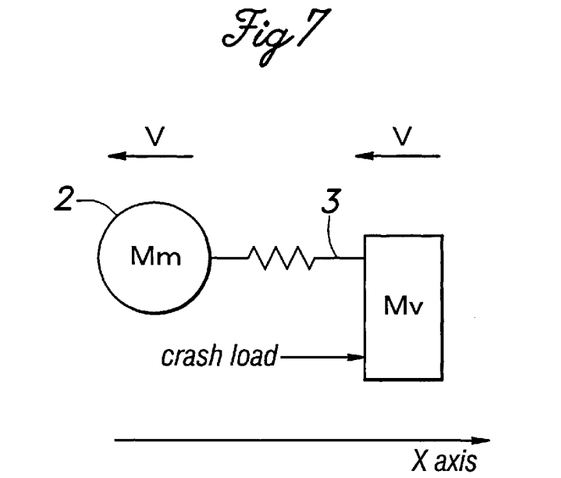
FIG. 7 is a conceptual diagram showing the relationship between the vehicle occupant, vehicle body and seat belt at the time of a vehicle crash.

Referring to FIG. 7, the vehicle occupant deceleration G1 and vehicle body deceleration G2 correspond to the input and output of a transfer function representing a two-mass spring-mass system consisting of the mass Mm of a vehicle occupant, a spring (such as a seat belt), and a vehicle body mass Mv. More specifically, the vehicle body deceleration G2 can be given as a second-order differentiation of the coordinate of the vehicle body mass Mv with respect to time.

However, in an actual automotive crash, if a three-point seat belt is used, the shoulder belt portion of the seat belt which can be considered as a spring engages the chest of the vehicle occupant corresponding to the center of the vehicle occupant mass Mm so that the shoulder belt portion can be considered as consisting of two springs, one extending between the chest and shoulder anchor, the other extending between the chest and the buckle anchor.

If the seat belt is entirely incorporated to the seat, the shoulder anchor and buckle anchor move as a single body, and the two parts experience an identical deceleration. In such a case, it can be assumed that the seat belt can be given as a composite of two springs, and the deceleration acting on the shoulder anchor and buckle anchor is identical to the input to the two-mass spring-mass system or the vehicle body deceleration.

Now, suppose if the buckle anchor point is fixedly attached to the vehicle body while the shoulder anchor is capable of movement relative to the vehicle body as an example in which the two anchor points undergo different movements relative to the vehicle body. In such a case, because the shoulder anchor and buckle anchor experience different decelerations, the springs cannot be simply combined or the decelerations acting on the shoulder anchor and buckle anchor cannot be simply equated to the vehicle body deceleration.

Meanwhile, the external force acting on the chest wholly consists of the force received from the seat belt. Therefore, if the time history of the load acting on the seat belt in the direction of deceleration agrees with the time history of the spring load in the two-mass spring-mass system, the chest receives the same deceleration waveform as the response of the vehicle occupant mass of the two-mass spring-mass system to the optimum waveform of vehicle body deceleration. This enables the vehicle occupant to reach the ridedown state in which the vehicle occupant is restrained by the seat belt substantially without any delay and the relative speed between the vehicle body and vehicle occupant is zero (no difference between the vehicle occupant deceleration G1 and vehicle body deceleration G2).

To achieve a time history of the seat belt that produces such a state, it suffices if the time history of the average deceleration of the shoulder anchor and buckle anchor (or vehicle body) is equal to the optimum waveform of the vehicle body deceleration. Introducing the concept of the waveform of average vehicle body deceleration allows an identical result in reducing the vehicle occupant deceleration as controlling the vehicle body deceleration so as to achieve the optimum waveform to be achieved.

The early rise in the tension of the seat belt to apply the deceleration to the vehicle occupant from an early stage can be most conveniently provided by a pyrotechnical actuator typically using a propellant. Pyrotechnical actuators are widely known in such applications as vehicle air bags and pretensioners. However, it was found due to the nature of its structure which relies on the generation of high pressure gas that such an actuator alone may not be able to produce a desired time history of the deceleration of the vehicle occupant. It was found that the provision of inertia mass prevents an oscillatory movement to the moveable end or vehicle occupant during the activation of the actuator. The inventors have discovered that such a problem can be overcome by adding a suitable amount of mass to the actuator end of the seat belt in combination with a cushioning member.

BRIEF SUMMARY OF THE INVENTION

In view of such problems of the prior art, a primary object of the present invention is to provide a vehicle occupant protection system which can improve the protection of the vehicle occupant at the time of a vehicle crash for a given dynamic stroke or a deformation stroke of a front part of the vehicle body.

A second object of the present invention is to provide a vehicle occupant protection system which can maximize the protection of the vehicle occupant with a minimum modification to the existing vehicle body structure.

A third object of the present invention is to provide a vehicle occupant protection system which can maximize the protection of the vehicle occupant without increasing the weight of the vehicle body or taking up any significant amount of space in the passenger compartment.

According to the present invention, such objects can be accomplished by providing an automotive vehicle occupant protection system, comprising: a seat supported on a floor of a vehicle body; a seat belt provided in association with the seat and including a moveable end; an actuator connecting the moveable end of the seat belt to a part of the vehicle body to selectively remove a slack from the seat belt; and a control unit including a deceleration sensor for detecting a frontal vehicle crash meeting a prescribed condition; the actuator including a main actuator unit adapted to move the moveable end of the seat belt in a direction to remove a slack from the seat belt immediately upon detection of a frontal vehicle crash; the main actuator unit including a cylinder integrally attached to a part of the vehicle body, a piston member slidably received in the cylinder and connected to the moveable end, a pyrotechnic gas generator provided on one end of the cylinder, and an accumulator chamber defining a prescribed volume and communicating with an output end of the pyrotechnic gas generator.

Thus, upon detection of a crash, the main actuator consisting of a pyrotechnic actuator increases the restraint of the seat belt by moving the moveable end of the seat belt so that a deceleration greater than the average deceleration (vehicle deceleration) is produced in the vehicle occupant. Because the seat belt and vehicle occupant behave as a spring mass system, an oscillatory motion of the vehicle occupant tends to be induced. Such an oscillatory motion is obviously undesirable to the end of minimizing the peak value of the deceleration acting on the vehicle occupant. Therefore, according to the present invention, an accumulator chamber is provided at the output end of the gas generator to prevent any such undesirable oscillatory motion of the moveable end of the seat belt or the vehicle occupant from occurring. The provision of the accumulator chamber also facilitates the control of the time history of the output of the actuator to best achieve the desired acceleration control for the vehicle occupant. The accumulator chamber may be defined by a casing provided adjacent to the cylinder and/or by a hollow interior of the piston member.

The system preferably includes a cushioning member for decelerating a movement of the moveable end following a certain initial travel of the moveable end. Thus, after the moveable part has moved by a prescribed distance, the movement is prevented by the cushioning member and an opposite deceleration is produced in the vehicle occupant so that the vehicle occupant and vehicle body move as a single body in a final phase of the crash, and decelerate at the average deceleration. This achieves a waveform of vehicle body deceleration suitable for the minimization of the deceleration of the vehicle occupant.

The anchor points may be provided in appropriate parts of the vehicle body, but all or some of them may be provided on parts of the seat. According to a preferred embodiment of the present invention, to obtain a highly predictable result, the seat belt may comprise three anchor points including a shoulder anchor, a seat bottom side anchor provided near a seat bottom on a same side as the shoulder anchor, and a buckle anchor provided near the seat bottom on an opposite side of the shoulder anchor.

According to a particularly preferred embodiment of the present invention, the moveable end comprises the shoulder anchor and a retractor, and is adapted to be guided along a length of a center pillar. The actuator is provided with a member for preventing a reversing movement of the actuator. The cushioning member may additionally serve as the member for preventing a reversing movement of the actuator. The moveable part may comprise a moveable member having a prescribed mass to even better prevent any undesirable oscillatory movement of the vehicle occupant and/or control the time history of the output of the actuator so as to achieve an optimum time history of the acceleration of the vehicle occupant.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
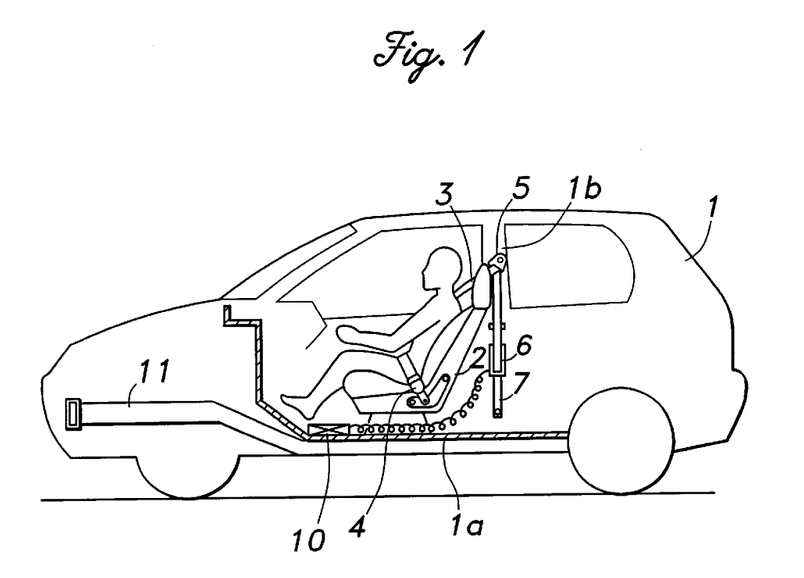
FIG. 1 is a schematic side view of the outline of the vehicle body structure fitted with a vehicle occupant protection system embodying the present invention.

FIG. 1 schematically illustrates the overall structure of a vehicle body 1 incorporated with a vehicle occupant protection system embodying the present invention. A seat 2 is mounted on a floor panel 1a which forms an integral part of the vehicle body 1. The vehicle occupant protection system includes a seat belt 3 for restraining the vehicle occupant to the seat 2. A buckle 4 is provided to the inboard side of the seat bottom of the seat 2 which is adapted to engage a tongue plate 3a provided in an intermediate part of the seat belt 3. An upper part of a center pillar 1b on the other side of the seat 2 is provided with a shoulder through anchor 5 supporting the seat belt 3 above the shoulder of the vehicle occupant, and a lower part of the center pillar 1b is provided with a retractor 6 for the corresponding end of the seat belt 3. The retractor 6a is incorporated with an emergency locking arrangement 6a for preventing the seat belt 3 from being paid out from the retractor 6 under a prescribed high acceleration condition as well known in the art. The other end of the seat belt 3 is fixedly attached to a fixed part of the vehicle body 1 adjacent to a lower part of the center pillar 1b. The seat 2 can be adjusted of its fore-and-aft position by means of seat slide rails as well known in the art.

Thus, when the seat belt 3 is fastened onto the vehicle occupant, the seat belt 3 extends from the retractor 6, passes through the shoulder through anchor 5, extends across the chest of the vehicle occupant, passes through the tongue plate 3a which is latched to the buckle 4, and then passed across the lap of the vehicle occupant before it reaches the fixed anchor point under the center pillar 1b.

Figure 2:
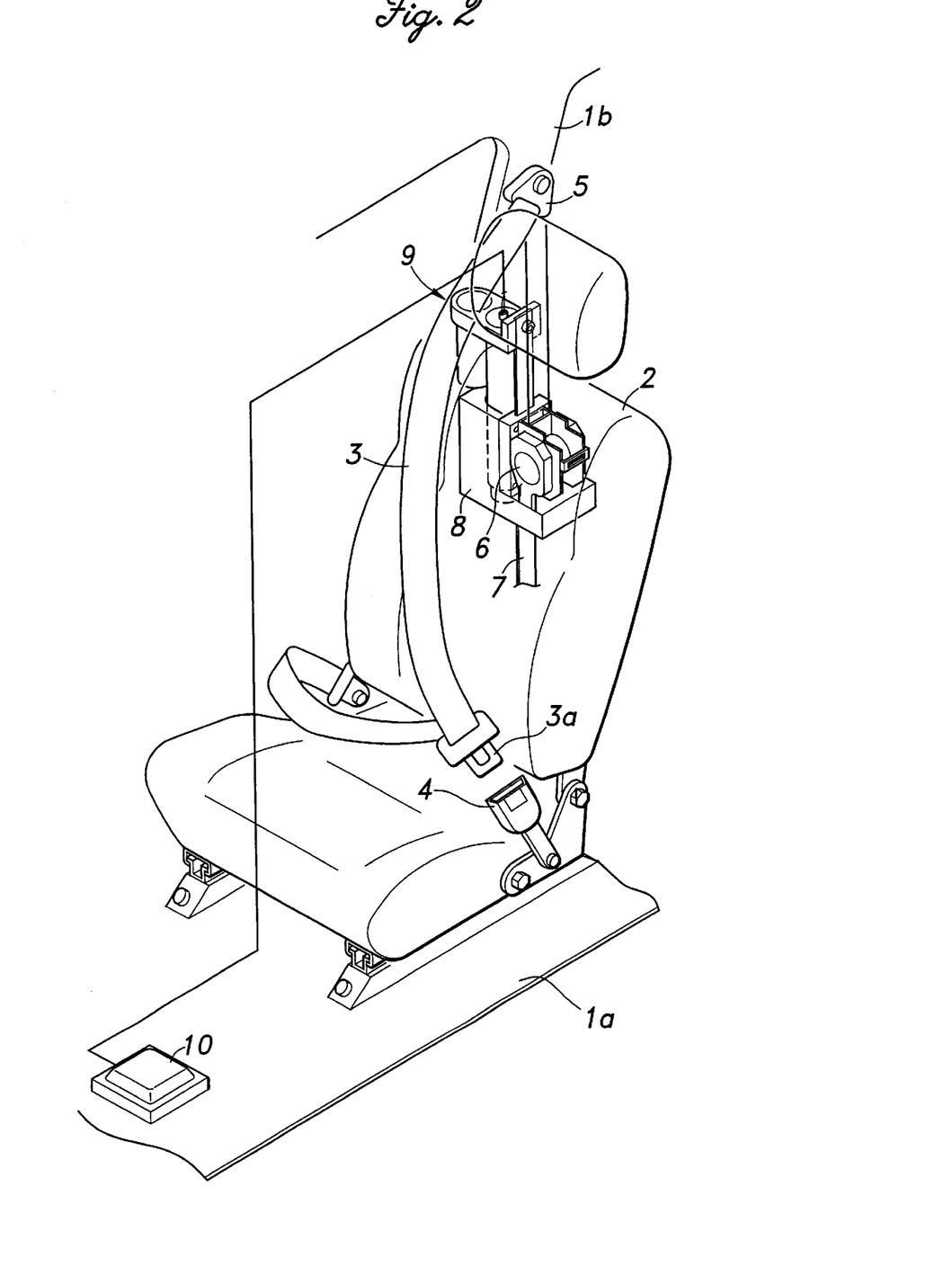
FIG. 2 is an overall perspective view of the seat fitted with the vehicle occupant protection system according to the present invention.
Figure 3:
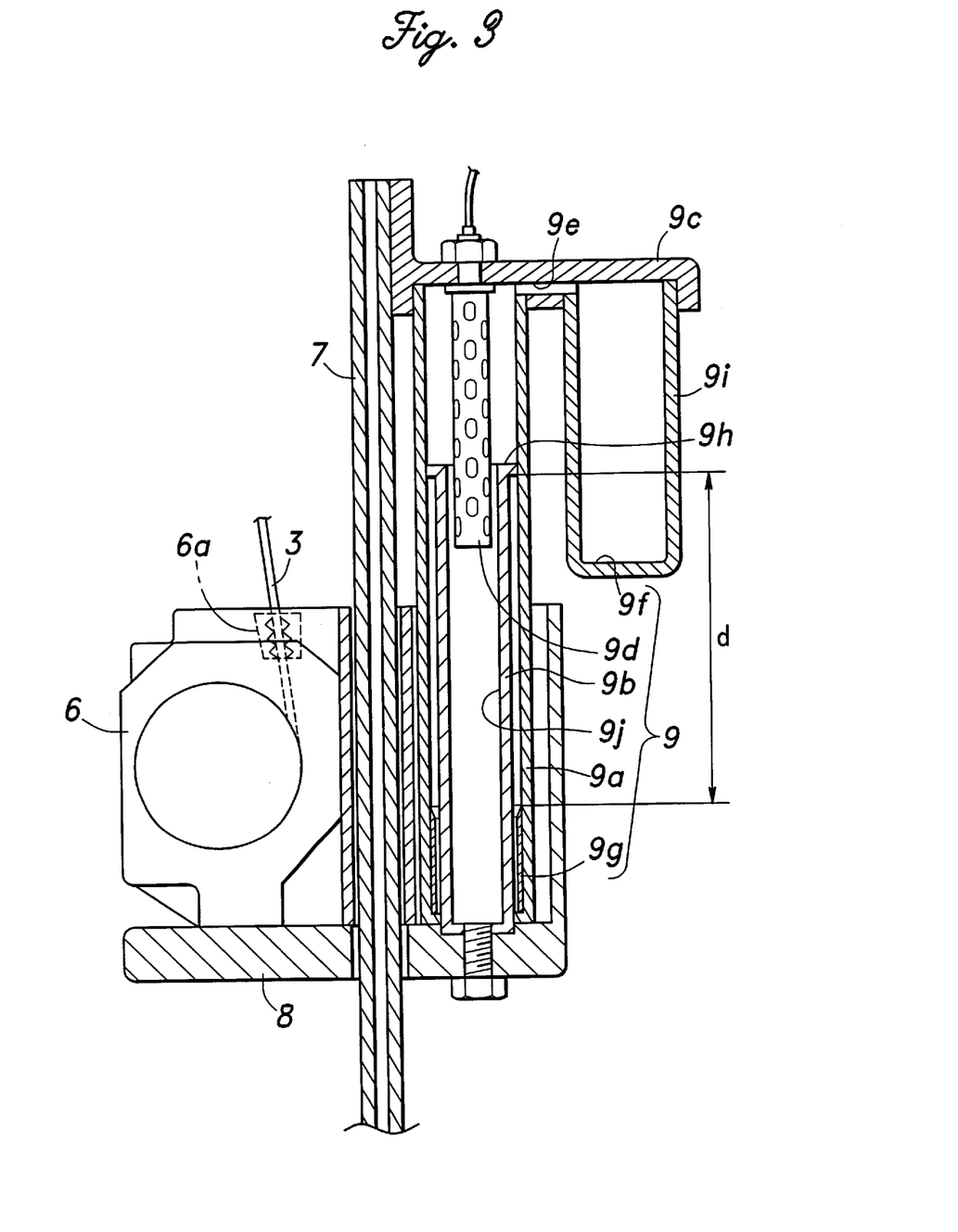
FIG. 3 is an enlarged sectional view of the vehicle occupant protection system.

As shown in FIGS. 2 and 3, the retractor 6 is mounted on a moveable base 8 having a certain mass and adapted to slide vertically along a slide rail 7 fixed attached to the center pillar 1b and extending along the length of the center pillar 1a. An actuator 9 is fixedly attached to the slide rail 7. The actuator 9 comprises a cylinder 9a extending in the vertical direction, a piston member 9b coaxially and slidably received in the cylinder 9a, a cylinder cap 9c closing the upper end of the cylinder 9a, a gas generator 9d adapted to selectively introduce gas into the cylinder cap 9c, and an accumulator chamber 9f having a prescribed volume and communicating with the interior of the cylinder cap 9c. The accumulator chamber 9f is defined by a casing 9i attached to a side of the cylinder 9b, and communicates with the interior of the cylinder cap 9c via a passage 9e defined therebetween.

The piston member 9b consists of a hollow cylindrical member which has an open upper end and a closed lower end, and is additionally provided with an external radial flange 9h at its upper end. The piston member 9b defines an internal chamber 9j having a certain volume. The lower end of the piston member 9b slightly extends from the lower end of the cylinder 9a in the inoperative state of the actuator 9, and is fixedly attached to the moveable base 8.

Thus, as the gas generator 9d is activated and the piston member 9b moves downward, the moveable base 8 along with the retractor 6 attached thereto is caused to move downward. A tubular cushioning member 9g is provided inside a lower part of the cylinder 9a in a coaxial relationship. The tubular cushioning member 9g defines an inner diameter which is smaller than the outer diameter of the flange 9h but larger than the outer diameter of the remaining part of the piston member 9b. More specifically, the upper end of the inner circumferential surface of the tubular cushioning member 9g is slightly tapered so that the flange 9h is smoothly guided into the tubular cushioning member 9g, and collapses or otherwise deforms the tubular cushioning member 9g in a controlled manner.

The actuator 9 described above thus comprises the cylinder 9a, piston member 9b, cylinder cap 9c, gas generator 9d and accumulator chamber 9f, and is designed to provide a primary acceleration that increases the restraint on the vehicle occupant. The tubular cushioning member 9g provides a secondary acceleration which controls the acceleration provided by the actuator 9 as will be described hereinafter.

To the gas generator 9d is connected a signal line from a control unit 10 mounted to an appropriate part (such as the floor panel 1a) of the vehicle body 1 and incorporated with a crash sensor which, for instance, may consist of a G sensor. The crash sensor provides a crash detecting signal to the gas generator 9d when a crash meeting a prescribed condition is detected. In response to a crash detecting signal, the gas generator 9d instantaneously produces expanding gas which is then introduced into the cylinder cap 9c.

A breakable pin (not shown in the drawing) is provided between the moveable part consisting of the moveable base 8 and retractor 6 and the slide rail 7 to prevent the movement of the moveable part unless the gas generator 9 is activated and a force exceeding a prescribed level is applied to the moveable part.

Referring to FIGS. 4a to 4c and 5a to 5c, the mode of operation of the embodiment of the present invention is described in the following by taking an example of a frontal crash onto a fixed structure.

Figure 4A:
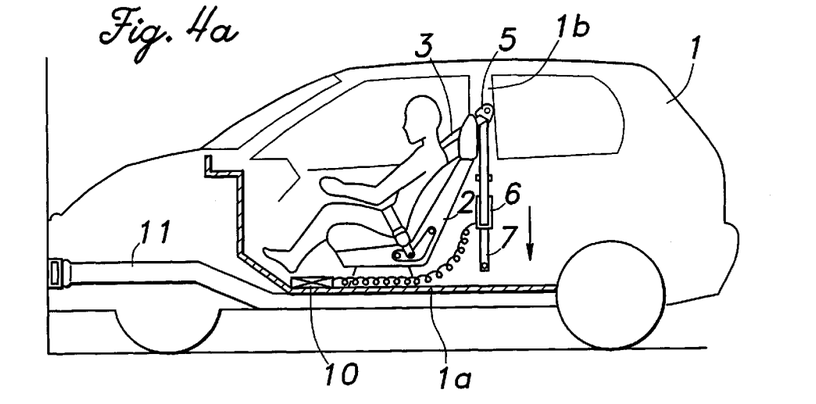
FIG. 4a is a schematic view of the vehicle body in an initial phase of the crash.

FIG. 4a shows a state of an initial phase (interval a of FIG. 6) immediately following the occurrence of a crash. The front end of the vehicle body collapses, and the front ends of side beams 11 integral with the floor panel 1a undergo a compressive deformation as shown in the drawing. The crash sensor incorporated in the control unit 10 detects the vehicle body deceleration resulting from the vehicle crash exceeding a prescribed intensity, and the control unit 10 judges the condition that is produced. If the control unit 10 judges that the condition meets the prescribed criterion, the gas generator 9d is activated.

Figure 5A:
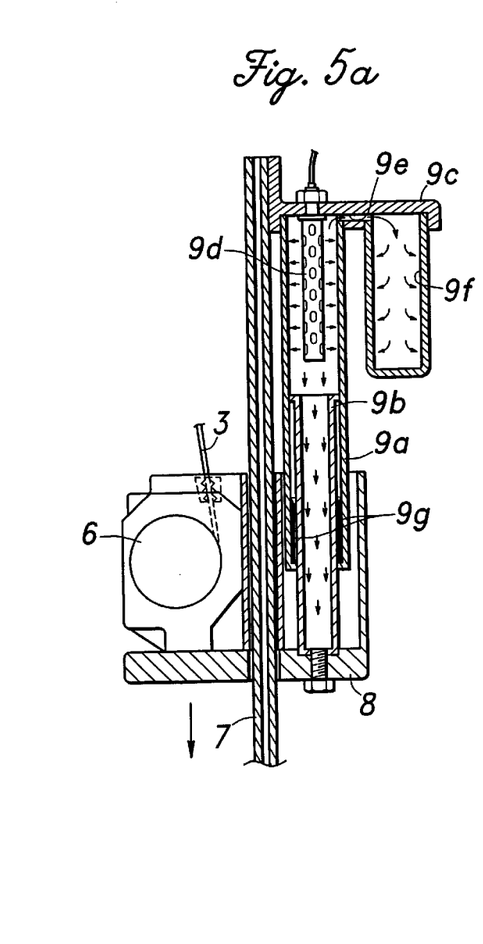
FIG. 5a is a sectional view showing the state of the actuator in an initial phase of the crash.

The expanding gas produced from the gas generator 9d is introduced into the cylinder cap 9c as indicated by the arrows in FIG. 5a, and the pressure of the expanding gas pushes the piston member 9b downward. As a result, the moveable base 8 and retractor 6 start moving downward or in the direction to increase the restraint of the seat belt 3 on the vehicle occupant. The provision of the accumulator chamber 9d allows the expanding gas to actuate the piston member 9b in a controlled manner. The internal chamber 9j of the hollow piston member 9b also provides the function of an additional accumulator chamber. In absence of such an accumulator chamber, the expanding gas applies a sharp increase in the force applied to the piston member 9b and moveable part which is attached to the piston member 9b, and an unfavorable oscillator motion of the moveable part tends to be induced as a response of a spring mass system including the vehicle occupant, seat belt and actuator to such a sharp rise in the input. Similarly, the mass added to the moveable part contributes to the reduction in such an oscillatory behavior of the system.

The early rise in the tension or load acting on the seat belt 3 corresponds to an increase in the restraint on the vehicle occupant and the deceleration of the vehicle occupant from an early phase of the crash. The resulting rise in the seat belt load is earlier than that provided by a conventional seat belt which is simply secured at three anchor points in restraining the vehicle occupant from being thrown forward under the inertia force. Therefore, the deceleration of the vehicle occupant is made to rise from a very early part of the crash as indicated by G1 in FIG. 6.

Figure 4B:
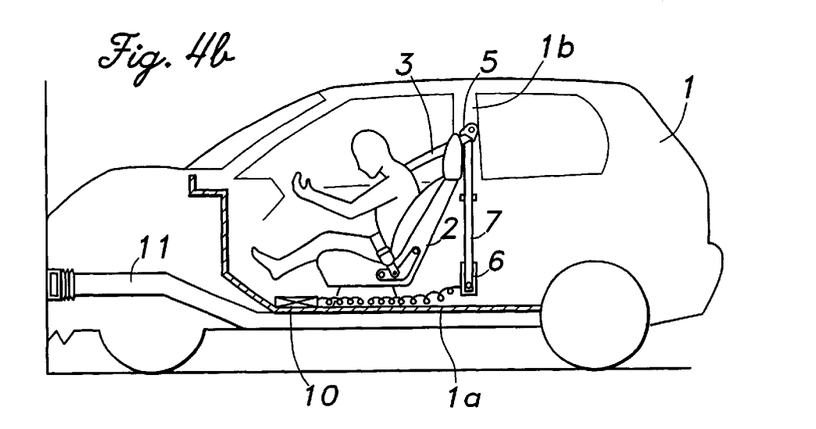
FIG. 4b is a schematic view showing an intermediate phase of the crash.
Figure 5B:
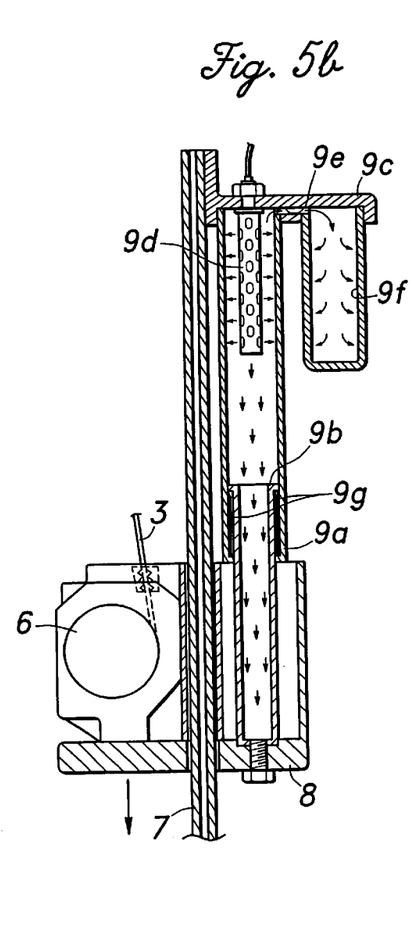
FIG. 5b is a sectional view showing the state of the actuator in an intermediate phase of the crash.
Figure 5C:
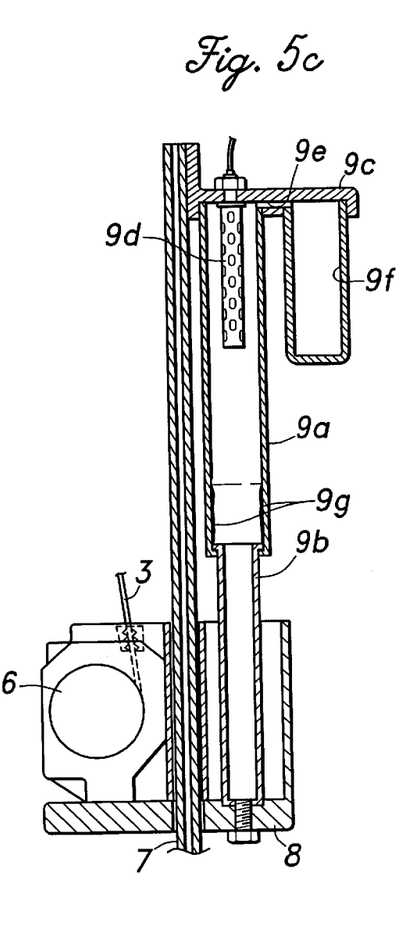
FIG. 5c is a sectional view showing the state of the actuator in a final phase of the crash.

FIG. 4b shows a state in an intermediate phase of the crash (interval b of FIG. 6). As the collapsing of the front part of the vehicle body progresses, the piston member 9b of the actuator 9 moves further downward with respect to the vehicle body as indicated in FIG. 5b. As the piston member 9b moves further downward, the flange 9h of the piston member 9b eventually collides with the cushioning member 9g in the cylinder 9a, and this decelerates the movement of the moveable base 8 and retractor 6, thereby producing an opposite (forward with respect to the vehicle body) acceleration to the vehicle occupant. This produces an effect equivalent to that produced by an acceleration directed in the opposite direction to the deceleration resulting directly from the crash acting on the passenger compartment. To better achieve such an effect, the effective mass of the moveable part and the acceleration of the moveable part at the time of the piston member 9b colliding with the cushioning member 9g are appropriately adjusted. It is preferable to design the properties (such as elongation and spring properties) of the seat belt 3 and the properties (such as impact absorbing property) of the cushioning member 9g so that the speed and deceleration of the vehicle occupant coincide with those of the vehicle body (seat 2) upon completion of the acceleration in the opposite direction acting on the moveable base 8 during this intermediate phase.

Figure 4C:
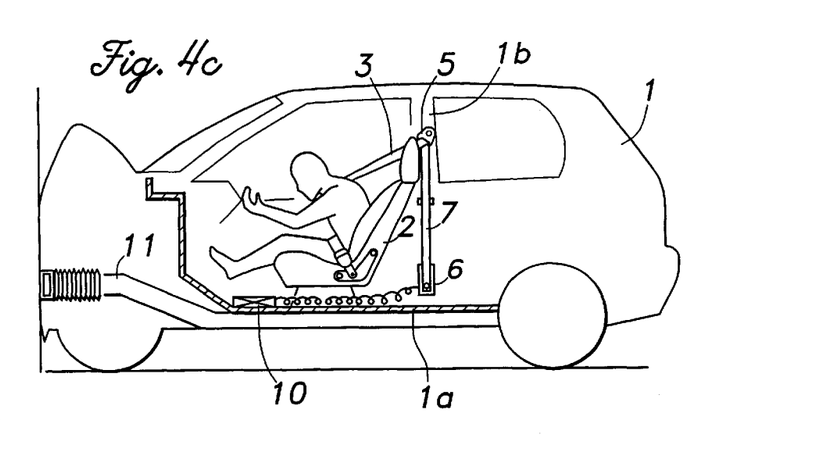
FIG. 4c is a schematic view showing a final phase of the crash.

FIG. 4c shows a state of a final phase (interval c of FIG. 6) of the crash. During the final phase, the movement of the piston member 9b is further decelerated by the cushioning member 9g, and the piston member 9b eventually comes to a complete stop. As a result, the retractor 6 also stops moving any further, and is retained at this position until the end of the vehicle crash by virtue of the wedging of the flange 9h of the piston member 9b into the cushioning member 9g.

During this final phase, once the speed and deceleration of the vehicle occupant agree with those of the vehicle body (seat 2), there is no relative movement between the vehicle occupant and vehicle body (seat 2), and the vehicle occupant continues to decelerate as a single body with the vehicle body (seat 2). In other words, the maximum value of the vehicle occupant deceleration G1 can be reduced by achieving a ride down state in which the relative speed between the vehicle occupant and vehicle body (seat 2) is minimized and the difference between the vehicle occupant deceleration G1 and vehicle body deceleration G2 is minimized.

Thus, the process described above can substantially reduce the vehicle occupant deceleration by controlling the deceleration produced in the retractor 6 so as to follow the optimum deceleration waveform or by designing the actuator 9 so as to produce the optimum deceleration waveform.

Thus, according to the foregoing embodiment, upon detection of a crash, the main part of the actuator consisting of a pyrotechnical actuator increases the restraint of the seat belt by moving the moveable part provided on a part of the vehicle body so that the vehicle occupant is allowed to experience an early rise in deceleration. Then, after the moveable part has moved by a prescribed distance, the movement is prevented by the cushioning member and an opposite deceleration is produced in the moveable part so that the vehicle occupant and vehicle body move as a single body in a final phase of the crash, and decelerate at the average deceleration. This achieves a waveform of vehicle body deceleration suitable for the minimization of the deceleration of the vehicle occupant. As a result, not only a substantial reduction in the vehicle occupant deceleration can be achieved with a smaller vehicle body deformation (dynamic stroke) but also the displacement of the vehicle occupant in the passenger compartment relative to the vehicle body can be reduced even more than possible by providing a load limiter in the restraining device to reduce the vehicle body deceleration. The smaller displacement of the vehicle occupant reduces the possibility of a secondary collision.

When an end of the seat belt is attached to the seat, and an intermediate part of the seat belt is attached to the moveable part via a buckle, the vehicle occupant and seat can be joined integrally to each other by using a conventional three-point seat belt incorporated to a seat so that the cost of the system can be minimized without requiring any substantial change to the existing system.

Although the present invention has been described in terms of a preferred embodiment thereof, it is obvious to a person skilled in the art that various alterations and modifications are possible without departing from the scope of the present invention which is set forth in the appended claims. For instance, all or some of the anchor points may be provided on parts of the seat and on parts of the vehicle body as required. Also, the actuator may be provided in any one of the anchor points of the seat belt including the buckle anchor and the seat bottom side anchor provided near or on the seat bottom on a same side as the shoulder anchor.

What is claimed is:

1. An automotive vehicle occupant protection system, comprising:

a seat supported on a floor of a vehicle body;

a seat belt provided in association with said seat and including a moveable end;

an actuator connecting said moveable end of said seat belt to a part of said vehicle body to selectively remove a slack from said seat belt; and a control unit including a deceleration sensor for detecting a frontal vehicle crash meeting a prescribed condition;

said actuator including a main actuator unit adapted to move said moveable end of said seat belt in a direction to remove a slack from said seat belt immediately upon detection of a frontal vehicle crash;

said main actuator unit including a cylinder integrally attached to a part of said vehicle body, a piston member slidably received in said cylinder and connected to said moveable end, a pyrotechnic gas generator provided on one end of said cylinder, and an accumulator chamber defining a prescribed volume and communicating with an output end of said pyrotechnic gas generator.

2. An automotive vehicle occupant protection system according to claim 1, wherein said accumulator chamber is defined by a casing provided adjacent to said cylinder.

3. An automotive vehicle occupant protection system according to claim 1, wherein said accumulator chamber is defined by a hollow interior of said piston member.

4. An automotive vehicle occupant protection system according to claim 1, wherein said actuator further comprises a cushioning member for decelerating a movement of said moveable end following a certain initial travel of said moveable end.

5. An automotive vehicle occupant protection system according to claim 1, wherein said seat belt comprises three anchor points including a shoulder anchor, a seat bottom side anchor provided near a seat bottom on a same side as said shoulder anchor, and a buckle anchor provided near said seat bottom on an opposite side of said shoulder anchor.

6. An automotive vehicle occupant protection system according to claim 1, wherein said shoulder anchor is provided with a retractor.

7. An automotive vehicle occupant protection system according to claim 6, wherein said moveable end comprises said shoulder anchor, and is adapted to be guided along a length of a center pillar.

8. An automotive vehicle occupant protection system according to claim 1, wherein said actuator is provided with a member for preventing a reversing movement of said actuator.

9. An automotive vehicle occupant protection system according to claim 1, wherein said moveable part comprises a moveable member having a prescribed mass.

* * * * *